US012251041B2

(12) United States Patent
Kopiness et al.

(10) Patent No.: US 12,251,041 B2
(45) Date of Patent: Mar. 18, 2025

(54) SYSTEMS AND METHODS FOR THERMAL SOFT START CONTROL (71) Applicant: THE VOLLRATH COMPANY, L.L.C., Sheboygan, WI (US)

(72) Inventors: Jeremiah Kopiness, Saukville, WI (US); Andrew Amrhein, Sheboygan, WI (US)

(73) Assignee: THE VOLLRATH COMPANY, L.L.C., Sheboygan, WI (US)

( * ) Notice: Subject to any disclaimer, the term of this patent is extended or adjusted under 35 U.S.C. 154(b) by 1015 days.

(21) Appl. No.: 17/114,244

(22) Filed: Dec. 7, 2020

(65) Prior Publication Data
US 2021/0085118 A1 Mar. 25, 2021

Related U.S. Application Data (63) Continuation of application No. 15/815,355, filed on Nov. 16, 2017, now Pat. No. 10,856,686.

(51) Int. Cl.
*A47J 27/00* (2006.01)
*G05D 23/30* (2006.01)
(Continued)

(52) U.S. Cl.
CPC ............ *A47J 27/004* (2013.01); *G05D 23/30* (2013.01); *H05B 1/0261* (2013.01); *H05B 6/06* (2013.01); *H05B 2213/07* (2013.01)

(58) Field of Classification Search
CPC .... H05B 6/06; H05B 1/0261; H05B 2213/07; G05D 23/30; A47J 27/004
See application file for complete search history.

(56) References Cited

U.S. PATENT DOCUMENTS 3,887,781 A 6/1975 Peters, Jr.
4,197,581 A 4/1980 Watrous et al.
(Continued)

FOREIGN PATENT DOCUMENTS

GB 2 207 305 A 1/1989
JP 05-166579 A 7/1993
(Continued)

OTHER PUBLICATIONS

International Report on Patentability on International Patent No. PCT U.S. Pat. No. 2018050183 dated May 19, 2020, 8 Pages.
(Continued)

*Primary Examiner* — Steven W Crabb
*Assistant Examiner* — Kuangyue Chen
(74) *Attorney, Agent, or Firm* — Foley & Lardner LLP (57) ABSTRACT A temperature regulation device for food items includes a food pan, a heating device configured to provide regulated heating of the food pan, a temperature sensor configured to detect a temperature of the food pan, and a control system. The control system is configured to control the heating device in response to at least the temperature of the food pan detected by the temperature sensor by providing a gradual warming control mode in response to the temperature sensor detecting the temperature of the food pan below a minimum preset temperature and providing a normal control mode in response to the temperature sensor detecting the temperature of the food pan above the minimum preset temperature.

20 Claims, 5 Drawing Sheets (51) Int. Cl.
*H05B 1/02* (2006.01)
*H05B 6/06* (2006.01)

(56) References Cited

U.S. PATENT DOCUMENTS

| | | | |
|---|---|---|---|
| 4,716,551 A * | 12/1987 | Inagaki | G11C 11/406 |
| | | | 327/187 |
| 4,812,625 A | 3/1989 | Ceste, Sr. | |
| 5,090,305 A | 2/1992 | Lehman | |
| 5,490,449 A | 2/1996 | Meister et al. | |
| 5,648,008 A | 7/1997 | Barritt et al. | |
| 5,809,994 A | 9/1998 | Maher, Jr. | |
| 8,247,748 B2 | 8/2012 | Watanabe et al. | |
| 9,307,862 B2 | 4/2016 | Roever et al. | |
| 2002/0008102 A1 * | 1/2002 | Boyd | H05B 6/062 |
| | | | 219/627 |
| 2011/0226753 A1 * | 9/2011 | Casanova Lacueva | ...... |
| | | | F24C 7/083 |
| | | | 219/462.1 |
| 2012/0074121 A1 * | 3/2012 | Gagas | H05B 3/0071 |
| | | | 219/385 |
| 2014/0339220 A1 * | 11/2014 | Metz | A47J 39/02 |
| | | | 219/621 |
| 2015/0272385 A1 | 10/2015 | Wang et al. | |
| 2015/0335202 A1 | 11/2015 | Wisner et al. | |
| 2016/0213196 A1 | 7/2016 | Roever et al. | |

FOREIGN PATENT DOCUMENTS

| | | |
|---|---|---|
| JP | H05-166579 | 7/1993 |
| JP | 2008-269912 | 11/2008 |
| JP | 2009-026570 | 2/2009 |
| JP | 2012-009199 | 1/2012 |
| JP | 4969350 | 7/2012 |
| JP | 5012164 | 8/2012 |
| JP | 5033733 | 9/2012 |
| JP | 2013-097936 | 5/2013 |
| JP | 2013-097990 | 5/2013 |
| JP | 5546367 | 7/2014 |
| WO | WO-2012/094770 A1 | 7/2012 |
| WO | WO-2013/016595 A1 | 5/2013 |
| WO | WO-2013/061595 | 5/2013 |
| WO | WO-2014/093476 A1 | 6/2014 |

OTHER PUBLICATIONS

International Search Report and Written Opinion on International Patent No. PCT/US2018/050183 dated Dec. 13, 2018, 332 pages.

* cited by examiner

SYSTEMS AND METHODS FOR THERMAL SOFT START CONTROL

CROSS-REFERENCE TO RELATED APPLICATION

This application is a continuation of U.S. application Ser. No. 15/815,355, filed Nov. 16, 2017, the entire disclosure of which is incorporated by reference herein.

BACKGROUND

The present invention relates generally to the field of food service equipment and, in particular, to the field of temperature controls for induction heating in food service equipment.

SUMMARY

A temperature regulation device for warming or maintaining the temperature of food items includes a food pan configured to hold a food item, an induction coil configured to warm the food item via inductive heating of the food pan, a temperature sensor configured to detect a temperature of the food pan, and a temperature control system coupled to the induction coil and the temperature sensor. The temperature control system is configured to control the induction coil in response to at least the temperature of the food pan detected by the temperature sensor and initiate a soft start control mode in response to the temperature sensor detecting the temperature of the food pan below a minimum preset temperature.

A method of warming or maintaining the temperature of food items in a food pan includes controlling an induction coil of a temperature regulation device in response to at least a temperature of the food pan detected by a temperature sensor and supplying low power to an induction coil to warm the food pan gradually in response to the temperature sensor detecting the temperature of the food pan below a minimum preset temperature.

A temperature control system for maintaining or warming a food pan coupled to an induction coil and a temperature sensor of a temperature regulation device and configured to control the induction coil in response to at least the temperature of the food pan detected by the temperature sensor and initiate a soft start control mode in response to the temperature sensor detecting the temperature of the food pan below a minimum preset temperature.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring to the figures generally, a temperature control system for use with a temperature regulation device is shown. The temperature regulation device (e.g., pod) may be used to increase, maintain, or regulate the temperature of a food pan containing a food item by heating the food pan to a specification temperature and then maintaining the food pan at that specified temperature. For example, a food pan holding soup may need to be warmed to and maintained at a temperature of 155 degrees Fahrenheit (° F.). Food pans may be introduced to the temperature regulation device at various temperatures, ranging from cold to pre-warmed or hot. In cases where a cold food pan is placed on the temperature regulation device, a temperature control system which gradually heats the food pan is desired. By gradually heating the food pan, overheating an empty food pan may be protected against. Further, heating cold food pans too rapidly may result in burned, boiled, charred, or unevenly cooked food. Accordingly, the temperature control system described herein detects the presence of a cold food pan and uses low power to gradually warm the food pan (e.g., thermal soft start control) to temperatures at which a normal operation mode may be started.

Figure 1:
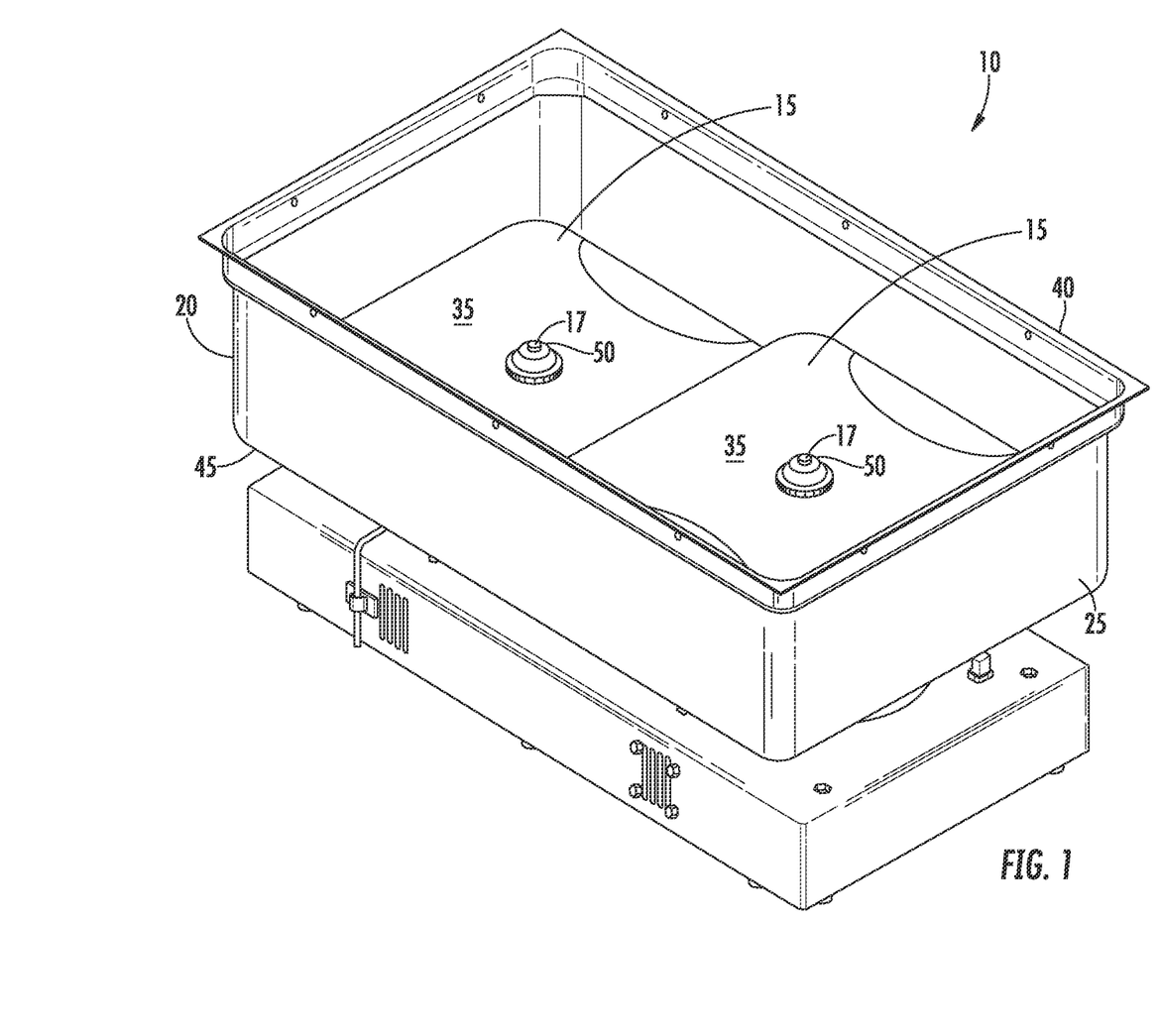
FIG. 1 is a perspective view of a temperature regulation device, according to an exemplary embodiment.

Referring to FIG. 1, the temperature regulation device 10 is shown as a module or pod 15 positioned in a well 20. In some embodiments, one or more pods 15 are positioned within the well 20, allowing temperature maintenance of more than one food pan (e.g., food pan 60 shown in FIG. 3). The well 20 defines an exterior or side wall 25 and a bottom wall 45. The exterior wall 25 has a perimeter 40 shaped to receive a food pan 60 within the well 20. The perimeter 40 can be rectangular (as shown in FIG. 1), another polygon, circular, or other appropriate shapes. In some embodiments, the well 20 is sized to accept a particular size of food pan (e.g., a 7-quart or 11-quart food pan). Although, the temperature regulation device 10 is shown as a countertop device, the temperature control systems and methods described herein may also be incorporated into a floor-standing unit or station.

Figure 2:
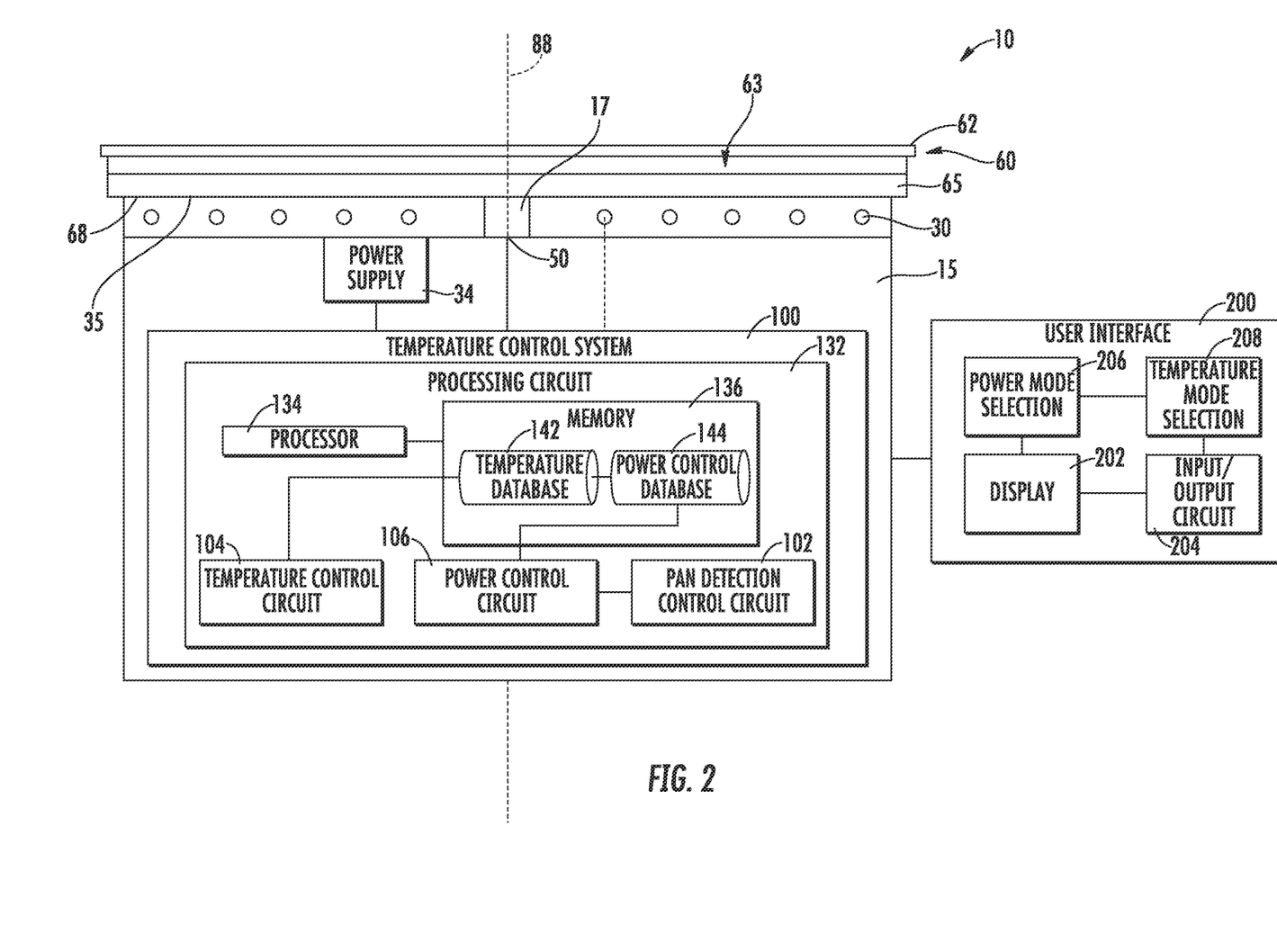
FIG. 2 is a schematic diagram of a temperature regulation device including, according to an exemplary embodiment.

As shown in FIG. 2, the pod 15 includes a housing (e.g., enclosure, etc.) having a top surface 35 (e.g., warming surface), a temperature sensor 17 positioned at a center 50 of the housing defined along center axis 88, one or more induction coils 30 positioned about the center axis 88 of the housing and separated a distance from the temperature sensor 17, and a power supply 34. The pod 15 is configured to regulate and/or maintain a temperature of a food pan 60 placed within the well 20 for food serving purposes. According to an exemplary embodiment, the pod 15 is an induction device. In some embodiments, the pod 15 may include an induction cooktop sufficient to warm or maintain food pan temperatures without the use of a well 20.

Figure 3:
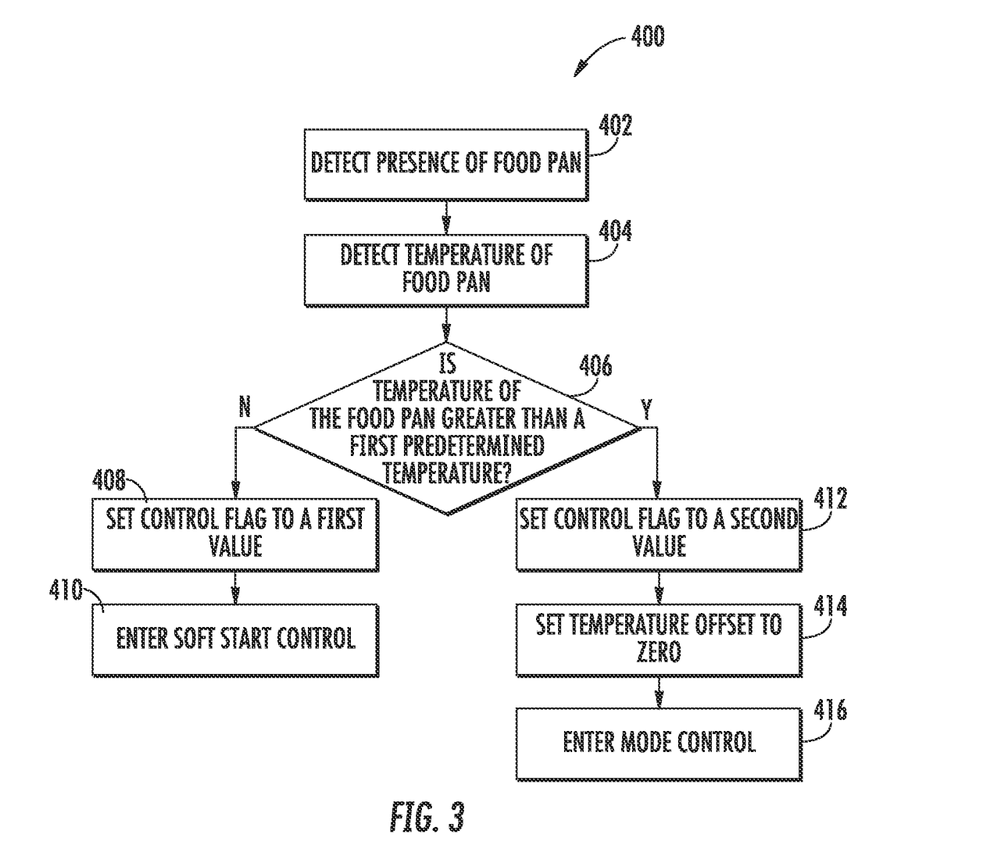
FIG. 3 is a flow diagram of a temperature control method for the temperature regulation device shown in FIGS. 1-3, according to an exemplary embodiment.

The food pan 60 includes a bottom 68 and a sidewall that define a receptacle 63, and a lip 62. The receptacle 63 is configured to hold a food item 65. Examples of food items 65 include soups, stews, sauces, meats, and pasta dishes. As shown in FIG. 3, the food pan 60 is placed directly on top of the pod 15 such that the bottom 68 of the food pan 60 is in contact with the temperature sensor 17 (e.g., with a gap present between the top surface 35 of the pod 15 and the bottom 68 of the food pan 60). The induction coil 30 of the pod 15 is included proximate the top surface 35 of the pod 15. The induction coil 30 provides heat to the food item 65 by inductively heating the bottom 68 of the food pan 60. The food pan 60 is conductive (e.g., made of metal). In a preferred embodiment, the food pan 60 is made of magnetic stainless steel.

The temperature sensor 17 is configured to detect a temperature of the food pan 60 in direct contact with the temperature sensor 17, which is indicative of a temperature of the food item 65 within the food pan 60 proximate the temperature sensor 17. In other embodiments, the temperature sensor 17 is configured to detect a temperature of the food pan 60 proximate, and not in direct contact with, the temperature sensor 17. In some embodiments, the temperature sensor 17 is a thermistor. In some embodiments, more than one temperature sensor 17 may be used to determine the temperature of the food pan 60. The temperature sensor 17 also provides feedback to the temperature control system 100 (e.g., temperature control circuit 104, power control circuit 106) in the form of temperature values such that a desired temperature value may be targeted (e.g., more or less power supplied to the induction coils 30).

In some embodiments, the induction coil 30 is configured to detect the presence of a food pan 60 on the pod 15. In these embodiments, the induction coil 30 determines the presence of a food pan 60 by sensing a current which is indicative of the magnitude of electromagnetic coupling between the induction coil 30 and the load resulting from the food pan 60 positioned on the top surface 35 of the pod 15. In some embodiments, the induction coil 30 is configured to transmit an indication of a presence of a food pan 60 and/or current values, switching frequency values, etc., indicative of the presence of a food pan 60 to the pan detection control circuit 102. The presence indication may prompt entry into a thermal soft start control, described further herein. In other embodiments, a separate presence sensor configured to detect the presence of the food pan is included.

The power supply 34 is configured to receive a power indication from the power control circuit 106 and/or a temperature indication from the temperature control circuit 104 and supply power to the induction coil 30 in accordance with the power and/or temperature indication. In this regard, the power supply 34 is coupled to the induction coil 30. When powered, an alternating current runs through the induction coil 30, thereby heating the conductive food pan 60 by electromagnetic induction.

The user interface 200 provides user inputs to the temperature control system 100 to control the operation of the temperature regulation device 10. The user interface 200 allows a user to adjust various settings (e.g., the targeted warming temperature, the targeted power setting, etc.) and activate one or more preset operating modes (e.g., a warming mode). The user interface 200 can be a series of buttons and a display screen, a touch screen, a series of buttons or switches and indicator lights, or any other conventional user interface capable of providing user inputs to the temperature control system 100 and displaying the selected user inputs and other information to the user. Accordingly, the user interface 200 includes a display 202, an input/output circuit 204, a power mode selection 206, and a temperature mode selection 208. The display 202 is used to present temperature values, temperature mode settings, power mode settings, and the like to a user of the temperature regulation device 10. In this regard, the display 202 is communicably and operatively coupled to the input/output circuit 204 to provide a visual display for receiving and displaying information on the user interface 200.

The input/output circuit 204 is structured to receive and provide communication(s) to a user of the temperature regulation device 10. In this regard, the input/output circuit 204 is structured to exchange data, communications, instructions, etc., with an input/output component of the user interface 200. Accordingly, in one embodiment, the input/output circuit 204 includes an input/output device such as a display device, a touchscreen, and/or a keypad. In another embodiment, the input/output circuit 204 may include communication circuitry for facilitating the exchange of data, values, messages, and the like between an input/output device and the components of the user interface 200. Accordingly, the input/output circuit 204 is communicably and operatively coupled to the power mode selection 206 and the temperature mode selection 208 to receive a selection from a user turning a knob, pressing a button, typing in a temperature or power value, etc. In yet another embodiment, the input/output circuit 204 may include machine-readable media for facilitating the exchange of information between the input/output device and the components of the user interface. In still another embodiment, the input/output circuit 204 may include any combination of hardware components (e.g., a touchscreen), communication circuitry, and machine-readable media.

The power mode selection 206 is a user selection provided on the user interface 200 including one or more selectable power modes. The power modes may include, but are not limited to, a low power mode, a medium power mode, and a high power mode. For example, the low power mode may be selected to heat the food pan 60 using a low wattage setpoint. The medium power mode may be selected to heat the food pan 60 using a wattage setpoint less than full power and the high power mode may be selected to heat the food pan 60 using the rated unit power. Based on the power mode selection 206, the temperature control system 100 controls the power supplied to the induction coil 30 (e.g., via the power control circuit 106).

The temperature mode selection 208 is a user selection provided on the user interface 20 including one or more selectable temperature modes. The temperature modes include a specific temperature value to which a food pan 60 is desired to be heated or warmed. The temperature mode can further include a temperature range within which the food pan 60 should be maintained. Based on the temperature mode selection 208, the temperature control system 100 controls the power supplied to the induction coil 30 (e.g., via the power control circuit 160) to maintain or reach that set temperature or temperature range.

Referring to FIG. 2, the pod 15 includes a temperature control system 100 including a pan detection control circuit 102, a temperature control circuit 104, and a power control circuit 106. The temperature control system 100 controls the operation of the induction coil 30 and other components in response to various inputs, including the temperature of the food pan 60 detected by the temperature sensor 17, user inputs from a user interface 200. In this regard, the temperature control system 100 is communicably and operatively coupled to the induction coil 30 and the temperature sensor 17. The temperature control system 100 utilizes the sensed values from the temperature sensor 17 to provide appropriate controls for maintaining and/or warming the food pan 60. The temperature control system 100 controls the operation of the induction coil 30 by controlling the amount of power supplied to the induction coil 30. Accordingly, the temperature control system 100 acts to control the temperature of the food pan 60 (and the food items 65 therein) through control of the induction coil 30 operation.

The temperature control system 100 includes a processing circuit 132 having a processor 134 and a memory 136. The processor 134 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 136 (e.g., RAM, NVRAM, ROM, Flash Memory, hard disk storage) may store data and/or computer code for facilitating the various processes described herein. Moreover, the one or more memory devices 136 may be or include tangible, non-transient volatile memory or non-volatile memory. Accordingly, the one or more memory devices 136 may include database components, object code components, script components, or any other type of information structure for supporting the various activities and information structures described herein.

In embodiments where the induction coil 30 is configured to detect a presence of a food pan 60 on the pod 15, the pan detection control circuit 102 is configured to receive indications from the induction coil 30. Accordingly, the pan detection control circuit 102 is communicably coupled to the induction coil 30. The received indications may include whether a food pan 60 is present on the pod 15. For example, the induction coil 30 may determine based on the sensed current values that a food pan 60 is present and transmit the presence indication to the pan detection control circuit 102. In some embodiments, the induction coil 30 also communicates what type of food pan 60 is likely present. For example, the induction coil 30 can detect whether an aluminum or 300 series stainless food pan is placed on the pod 15 using various ranges of input current, output current, and switching frequencies and/or equations involving one or more of the input current, output current, and switching frequency values. Based on these determinations, the pan detection control circuit 102 determines whether to provide heating to the food pan 60 and/or whether to enable a thermal soft start control (described further herein) of the food pan 60.

Still referring to FIG. 2, the power control circuit 106 is configured to receive control signals from the power mode selection 206 of the user interface 200 and provide control to the induction coil 30 based on the amount of power supplied to the induction coil 30. The power control circuit 106 is thus communicably and operatively coupled to the power mode selection 206 and to the induction coil 30 via the power supply 34. Power selection modes may include, for example, a low power mode, a medium power mode, and a high power mode. The power control circuit 106 is configured to receive an indication of selection of one of these power modes and control the amount of power supplied to the induction coil 30 accordingly. As an example, the power control circuit 106 receives an indication from the power mode selection 206 that a user has selected a medium power mode and in response, supplies a magnitude of power to the induction coil related to a predetermined setpoint. In other arrangements, more or less power selection modes may be included with the user interface 200.

The power control circuit 106 is further configured to control the signal indicating the amount of power the power supply 34 should supply to the induction coil in the event of a thermal soft start control scheme. During times when a thermal soft start control scheme is entered into, the power control circuit 106 receives an indication from the temperature control circuit 104 to provide a signal to the power supply 34 to provide power in accordance with a low power mode selection (even in times when a temperature mode is selected from the user interface 200). This allows for proper operation of the thermal soft start control such that the power supplied to the food pan 60 is operated in accordance with a low power mode, where the low power mode is used to gradually heat a cold food pan. If a temperature power mode was used to control a thermal soft start of a cold food pan, full power (e.g., 400 watts) would immediately be applied to the induction coil 30 to heat the food pan 60 rapidly to attempt to reach a targeted temperature. As a result, in some instances, the temperature of the food pan 60 could reach temperatures of greater than 210 degrees Celsius (° C.) in less than approximately 5 seconds. This type of temperature control can result in unwanted food item conditions (e.g., burning, scorching, boiling) and damage to the food pan 60 or other parts of the system 10.

The temperature control circuit 104 is configured to receive control signals from the temperature mode selection 208 of the user interface 200 and provide temperature control to the induction coil 30 based on detected temperature values from the temperature sensor 17, as described further herein. Accordingly, the temperature control circuit 104 is communicably and operatively coupled to the temperature mode selection 208, the induction coil 30 via the power supply 34, and the temperature sensor 17. The temperature control circuit 106 provides temperature regulation to the food pan 60 based on the temperature values received from the temperature sensor 17. The received temperature values from the temperature sensor 17 are used to determine whether more or less heat should generated for heating the food pan 60 using the power supply 34 providing power to the induction coil 30.

In some arrangements, the temperature control circuit 104 communicates the temperature controls to the power control circuit 106 to then communicate an amount of power to be applied to the food pan 60 via the induction coil 30. For example, a user sets the temperature mode selection 208 to a temperature of 200° F., which is then signaled to the temperature control circuit 106. The temperature control circuit 104 determines that the food pan 60 (and contents therein) are at a temperature of 150° F. Based on this information, the temperature control circuit 106 communicates to the power control circuit 106 to supply a set amount of power to reach the targeted temperature of 200° F. The power control circuit 106 supplies the power to the induction coil 30 accordingly.

The temperature control circuit 104 is configured to determine whether to enter into a thermal soft start control. The temperature control circuit 104 determines that if the sensed temperature values received from the temperature sensor 17 are below a certain temperature threshold, the food pan 60 should be warmed using a thermal soft start control scheme. Upon receiving sensed temperature values under the food pan temperature threshold, the temperature control circuit 104 communicates a soft start control message to the power control circuit 104 to enter into the soft start control shown in FIG. 5 and described further herein. If the sensed food pan temperature is not below the threshold, the temperature control circuit 104 communicates a normal operation control message to the power control circuit 106, which then proceeds with warming the food pan 60 based on a non-soft start control scheme. In this regard, the temperature control circuit 104 is communicably and operatively coupled to the power control circuit 106.

Still referring to FIG. 2, the temperature control system 100 further includes a temperature database 142. The temperature database 142 is configured to hold, store, categorize, and otherwise serve as a repository for information associated with a temperature sensed by the temperature sensor 17 and temperature values and offsets used in the control scheme described herein. Accordingly, the temperature database 142 is accessible by the temperature control circuit 104 and the power control circuit 106. The temperature database 142 additionally includes tables corresponding to the amount of power necessary to reach a specific temperature or to bring a food pan 60 temperature up to a set temperature. The tables may include preset temperature values, such as a temperature value below which the thermal soft start control scheme is entered into upon detection of a food pan 60 and/or upon a mode selection (e.g., power mode selection 206, temperature mode selection 204) on the user interface 200. The temperature database 142 can also include a preset temperature offset value, which is used during a thermal soft start control, described further below with regard to FIG. 5.

The temperature control system 100 further includes a power control database 144. The power control database 144 is configured to hold, store, categorize, and otherwise serve as a repository for information associated with power to be supplied to an induction coil 30 and the associated power mode selections. The power control database 144 additionally includes values associated with the low power mode control used for the thermal soft start control described herein. Accordingly, the power control database 144 is accessible by the temperature control circuit 104 and the power control circuit 106. The power control database 144 includes tables corresponding to the amount of power to be supplied to an induction coil 30 based on the power mode selected by the user (e.g., low power mode, medium power mode, high power mode). In some embodiments, the power control database 144 additionally could include tables corresponding to the amount of power necessary to reach a specific temperature or to bring a food pan 60 temperature up to a set temperature.

Referring now to FIG. 3, an example method for food pan temperature control is depicted. Method 400 may be implemented by the temperature regulation device 10 of FIGS. 1-2, such that reference may be made to one or more components of FIGS. 1-2 in explaining method 400.

The presence of a food pan is detected at 402. The temperature of the food pan is detected at 404. After the pan is detected and that indication is communicated by the pan detection control circuit 102, the temperature sensor 17 detects the temperature of the food pan 60. The detected temperature is communicated to the temperature control circuit 104.

The temperature of the food pan relative to a first predetermined temperature is determined at 406. In some arrangements, the temperature control circuit 104 compares the detected temperature value from step 404 to a stored first predetermined temperature. The first predetermined temperature may be stored in the temperature database 142. The first predetermined temperature is indicative of whether the food pan 60 has been pre-warmed or contains food that has been pre-warmed or heated prior to placement on the temperature regulation device 10. The first predetermined temperature may be selected to be a value below which rapid heating of the food pan 60 may be detrimental to the food pan 60 and/or the food contents 65 and above which, a normal (e.g., mode) operation may be used without the possibility of heating too rapidly.

If the temperature of the food pan 60 is less than the first predetermined temperature, a control flag is set to a first value at 408. Setting the control flag to a first value designates that thermal soft start control will take place. The control flags may be stored in either the temperature database 142, power control database 144, or a separate database included with the temperature control system 100 such that the set control flag is accessible to the controls described herein (e.g., accessible by the power control circuit 106, temperature control circuit 104). Next, a soft start control is started at 410. The thermal soft start control is described below and shown in FIG. 4.

If the temperature of the food pan 60 is greater than the first predetermined temperature, a control flag is set to a second value at 412. If the temperature of the food pan 60 exceeds the first predetermined temperature, it is likely that the food pan 60 has been pre-warmed or that the food item in the food pan 60 is already warmed. Accordingly, no thermal soft start control is needed. Setting the control flag to the second value designates that a thermal soft start control has not taken place. The temperature offset is then set to zero at 414 and the operation enters mode control at 416. In this regard, either a temperature mode control or a power mode control, as described above, is started. For the temperature mode control, a temperature mode selection 208 has been selected by a user on the user interface 200. Using the selections made by the user, the temperature control circuit 104 and the power control circuit 106 operate to maintain or reach the temperature set by the user. For the power mode control, a power mode selection 206 has been selected by the user on the user interface 200. As noted above, using the selection made by the user, the power control circuit 106 controls the power supplied to the food pan 60.

Figure 4:
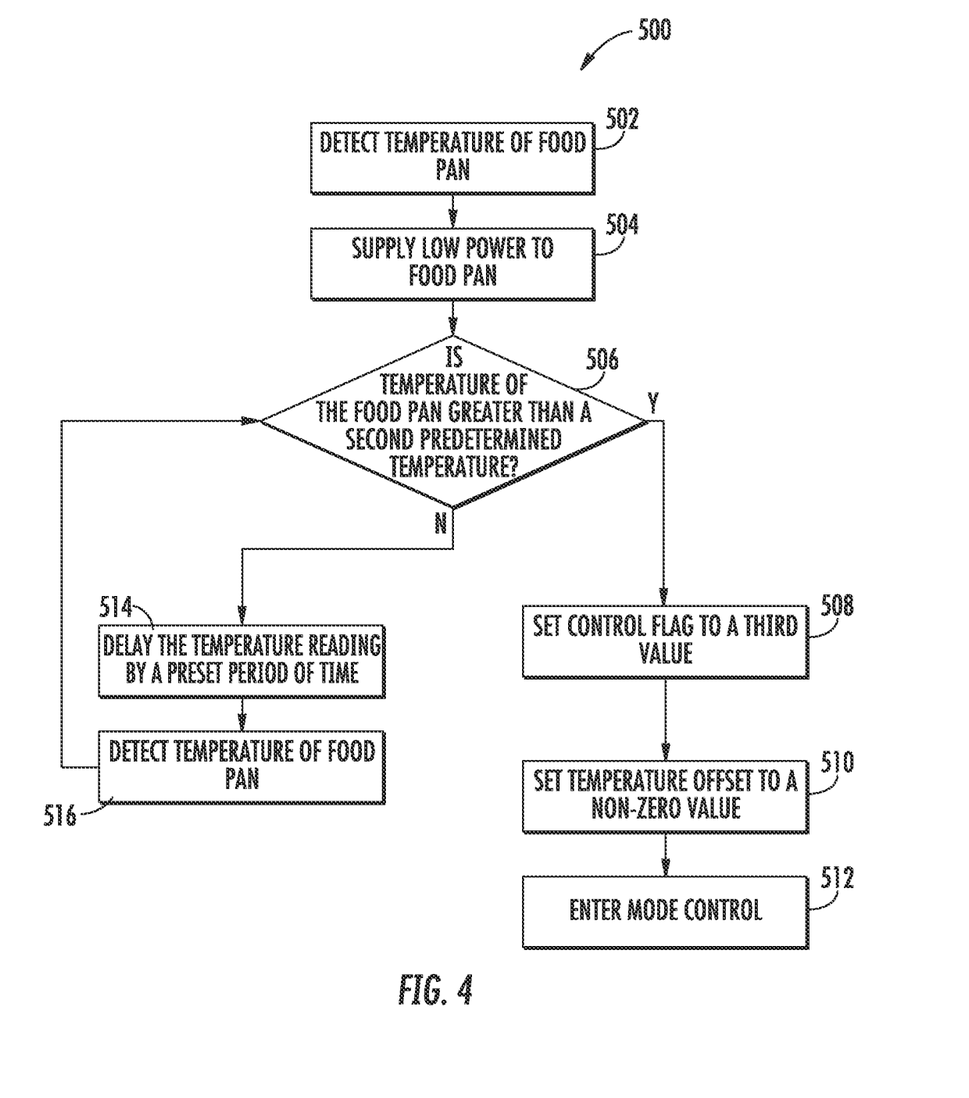
FIG. 4 is a flow diagram of a thermal soft start control method of the temperature control method of FIG. 4, according to an exemplary embodiment.

Referring to FIG. 4, a method for using a thermal soft start control is shown, according to an exemplary embodiment. Method 500 may be implemented by the temperature regulation device 10 of FIGS. 1-2, such that reference may be made to one or more components of FIGS. 1-2 in explaining method 500.

A temperature of the food pan is detected at 502. The temperature sensor 17 is configured to detect a temperature of the food pan 60 indicative of a temperature of the food item 65. The temperature sensor 17 provides feedback to the temperature control system 100 (e.g., temperature control circuit 104, power control circuit 106) in the form of temperature values such that a desired temperature value may be targeted (e.g., more or less power supplied to the induction coils 30).

A low power is supplied to the food pan at 504. Low power is supplied to the food pan 60 (via the induction coil 30). As the low power is supplied, the induction coil 30 provides heat to the food pan 60 and food item 65 by inductively heating the bottom 68 of the food pan 60. In some arrangements, the power is pulsed in short bursts for heating the food pan 60.

The temperature of the food pan relative to a second predetermined temperature is determined at 506. In some arrangements, the temperature control circuit 104 compares the detected temperature value from step 502 to a stored second predetermined temperature. The second predetermined temperature may be stored in the temperature database 142. The second predetermined temperature is greater than the first predetermined temperature described in FIG. 3. The second predetermined temperature is indicative of whether the food pan 60 has been warmed to a point such that the thermal soft start control may be exited and a normal (e.g., mode) operation may be entered. The second predetermined temperature may be selected to be a value below which rapid heating of the food pan 60 may be detrimental to the food pan 60 and/or the food contents 65 and above which, a normal (e.g., mode) operation may be used without the possibility of heating too rapidly.

If the temperature of the food pan is greater than the second predetermined temperature, a control flag is set to a third value at 508. Setting the control flag to the third value indicates that the temperature regulation device 10 has completed a thermal soft start control.

If the temperature regulation device 10 has completed a thermal soft start control, a temperature offset is set to a non-zero value at 510. In some arrangements, the temperature offset if set by the temperature control circuit 104. The temperature offset may be stored in the temperature database 142. The temperature offset is added to the detected temperature value. The temperature offset is necessary because the induction coils 30 of the temperature regulation device 10 are positioned about the center axis 88 of the housing away from the temperature sensor 17. Accordingly, the temperature sensor 17 is positioned where there are no heating elements (induction coils 30). Because of this arrangement, the temperature sensor 17 may detect a temperature slightly lower than the actual temperature of the food pan 60 because it is located away from any heating elements. The non-zero temperature offset value may be approximately 10° Celsius (C). In other embodiments, the non-zero temperature offset value may be more or less than 10° C.

After the temperature offset is set to a non-zero value at 510, a mode control is started at 512. In this regard, either a temperature mode control or a power mode control, as described above, is started. For the temperature mode control, a temperature mode selection 208 has been selected by a user on the user interface 200. Using the selections made by the user, the temperature control circuit 104 and the power control circuit 106 operate to maintain or reach the temperature set by the user. For the power mode control, a power mode selection 206 has been selected by the user on the user interface 200. As noted above, using the selection made by the user, the power control circuit 106 controls the power supplied to the food pan 60.

If the temperature of the food pan is not greater than the second predetermined temperature, the next temperature reading is delayed by a preset period of time at 514. The preset delay period of time may be set to allow enough time for sufficient heating to take place between temperature readings to detect an increase in the temperature of the food pan 60, but not too much time for the food pan 60 to be overheated. As an example, a preset delay period of time is set to approximately 30 seconds between temperature readings.

Next, the temperature of the food pan is detected at 516 and the method returns to step 506, where the temperature of the food pan relative to a second predetermined temperature is determined. The thermal soft start control method continues until the temperature of the food pan 60 exceeds the second predetermined temperature, a non-zero offset if set, and normal (e.g., mode) control operation is started at 512.

Figure 5:
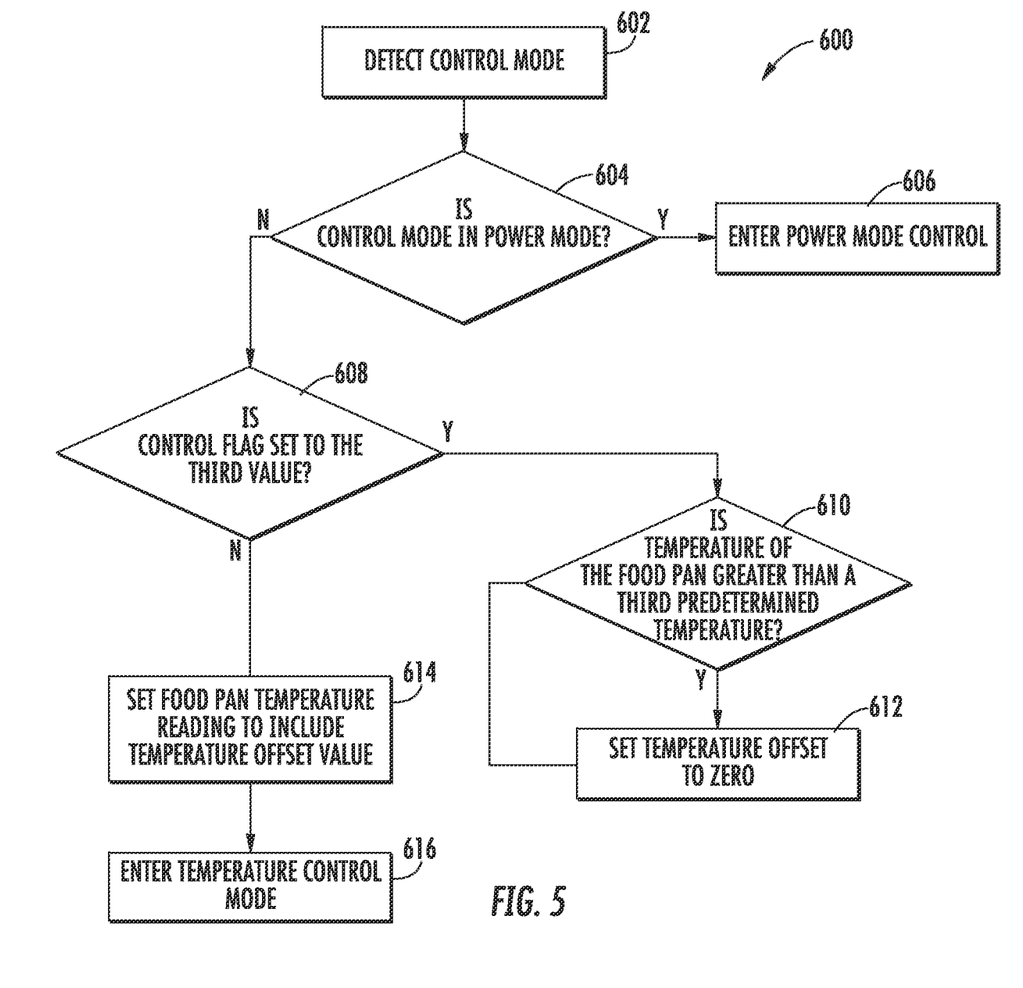
FIG. 5 is a flow diagram of a temperature control method of the temperature regulation device shown in FIGS. 1-3, according to an exemplary embodiment.

Referring now to FIG. 5, an example method for food pan temperature control is depicted. Method 600 may be implemented by the temperature regulation device 10 of FIGS. 1-3, such that reference may be made to one or more components of FIGS. 1-3 in explaining method 600. Further, method 600 is a continuation of the temperature control methods described in FIGS. 3-4, such that reference may be made to one or more method steps in FIGS. 3-4 in explaining method 600.

A control mode is detected at 602. The control mode is detected by the temperature control system 100 and is based on which mode selection a user selects. As described above, the user may select either a power mode selection 206 or a temperature mode selection 208 on the user interface 200. In some arrangements, only one of a power mode selection 206 or a temperature mode selection 208 is provided on a particular temperature regulation device 10 such that the device always operates in either a temperature control mode or a power control mode. In other arrangements, both a power mode selection 206 and a temperature mode selection 208 are provided on the user interface 200 such that a user may select which control mode to use.

It is determined whether the control mode is in the power mode at 604. If the control mode is in the power mode, the power mode control is entered at 606. The power mode control includes controlling the power supplied to the induction coils 30 to heat the food pan 60 based on a user selection of a low power mode, medium power mode, or high power mode. In other embodiments, more or less power modes may be included. If the control mode is not in the power mode, the control mode is thus in the temperature control mode. The temperature control mode includes controlling the power supplied to the induction coils 30 to heat the food pan 60 based on reference to a set temperature. The desired temperature is set by the user on the user interface 200. The temperature control mode attempts to target the desired temperature by supplying power to the induction coils 30.

If the control mode is not in the power mode, it is determined whether the control flag is set to the third value at 608. The third value set as a control flag during step 508 of FIG. 5 is indicative of utilization of a thermal soft start control. As noted, during the thermal soft start control method of FIG. 4, a temperature offset is designated as a non-zero value (at step 510) to accommodate the temperature difference between the center of the temperature regulation device 10 where the temperature sensor 17 is positioned and the middle to outer portions of the device 10 where the heating elements (e.g., induction coils 30) are positioned. Thus, a control flag set to the third value is also indicative of a situation in which the temperature offset may need to be removed (e.g., the temperature regulation device 10 is pre-warmed enough to not have significant temperature differences between the temperature sensor 17 and the induction coils 30 of the device 10).

If the control flag is set to the third value, it is next determined whether the temperature of the food pan is greater than a third predetermined temperature at 610. The temperature sensor 17 detects the current temperature of the food pan 60 and relays the temperature value to the temperature control circuit 104 to determine whether the temperature value exceeds the third predetermined temperature. The third predetermined temperature may be chosen to account for the temperature offset that may be set during a thermal soft start control of the temperature regulation device 10.

If the temperature of the food pan is greater than the third predetermined temperature, the temperature offset is set to zero at 612. At this point, if the third predetermined temperature is exceeded, accounting for the temperature difference between the temperature sensor 17 and the induction coils 30 is no longer of concern. Next, either if it is determined that the temperature of the food pan is not greater than the third predetermined temperature at 610 or if the temperature offset is set to zero at 612, the food pan temperature reading is set to include the set temperature offset value at 614. At this point, the temperature offset value may be zero or non-zero depending on the various temperature determinations and control flags set by methods 400-600 as described above. Finally, a temperature control mode is entered at 616. As noted above, the temperature control mode includes controlling the power supplied to the induction coils 30 to heat the food pan 60 based on reference to a set temperature. The desired temperature is set by the user on the user interface 200 and the temperature control mode attempts to target the desired temperature by supplying appropriate power to the induction coils 30.

The construction and arrangement of the apparatus, systems, and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

References herein to the positions of elements (e.g., "top," "bottom," "above," "below," "upper," "lower," etc.) are merely used to describe the orientation of various elements as illustrated in the Figures. It should be noted that the orientation of various elements may differ according to other exemplary embodiments, and that such variations are intended to be encompassed by the present disclosure.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more dedicated processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

What is claimed is:

1. A temperature regulation device for food items, the temperature regulation device comprising:
 a food pan;
 a heating device comprising a coil and configured to provide regulated heating of the food pan;
 a temperature sensor configured to detect a temperature of the food pan;
 a control system configured for controlling the heating device in response to at least the temperature of the food pan detected by the temperature sensor by:
  providing a gradual warming control mode by applying a first power to the coil of the heating device in response to the temperature sensor detecting the temperature of the food pan below a minimum preset temperature; and
  switching to a normal control mode by applying a second power to the coil of the heating device in response to the temperature sensor detecting the temperature of the food pan above the minimum preset temperature, wherein the second power is higher than the first power such that the second power causes the coil to heat the food pan faster than the first power.

2. The temperature regulation device of claim 1, wherein the first power is electrical power configured to cause the coil to cause warming of the food pan.

3. The temperature regulation device of claim 1, further comprising a user interface configured to receive a temperature selection, wherein the control system is configured to provide the normal control mode by controlling the heating device in accordance with the temperature selection.

4. The temperature regulation device of claim 1, further comprising a user interface configured to receive a power selection, wherein the control system is configured to provide the normal control mode controlling the heating device in accordance with the power selection.

5. The temperature regulation device of claim 1, wherein the control system further comprises a pan detection circuit configured to detect whether the food pan is in position relative to the heating device.

6. The temperature regulation device of claim 5, wherein the pan detection circuit is configured to prevent operation of the heating device in responses to detecting that the food pan is not in position relative to the heating device.

7. The temperature regulation device of claim 1, wherein the control system is further configured to provide the gradual warming control mode by:
 determining that the temperature of the food pan is less than a second preset temperature;
 in response to a determination that the temperature of the food pan is less than the second preset temperature, delaying a subsequent temperature reading of the food pan by a preset period of time; and
 detecting the subsequent temperature reading of the food pan.

8. The temperature regulation device of claim 1, wherein the coil is an induction coil.

9. A method of heating food items in a food pan, the method comprising:
 controlling a heating device to provide heating to the food pan based on a temperature of the food pan detected by a temperature sensor by:
  providing a first power to a coil of the heating device in response to the temperature sensor detecting the temperature of the food pan below a minimum preset temperature, the first power configured to cause the coil to warm the food pan gradually; and
  providing a second power to the coil of the heating device in response to the temperature sensor detecting the temperature of the food pan above the minimum preset temperature, wherein the second power is higher than the first power such that the second power causes the coil to heat the food pan faster than the first power.

10. The method of claim 9, further comprising:
 detecting a presence of the food pan proximate the heating device; and
 operating the heating device at the low power in response to detecting the presence of the food pan proximate the heating device.

11. The method of claim 9, further comprising:
 detecting the temperature of the food pan;
 while operating the heating device at the first power, determining that the temperature of the food pan is less than a second preset temperature;
 in response to a determination that the temperature of the food pan is less than the second preset temperature, delaying a subsequent temperature reading of the food pan by a preset period of time; and
 detecting the subsequent temperature reading of the food pan.

12. The method of claim 9, wherein operating the heating device at the second power comprises:
 receiving a temperature selection from a user; and
 determining the second power such that operating the heating device at the second power drives the temperature of the food pan to the temperature selection.

13. The method of claim 9, further comprising receiving a user selection of the second power via a user interface.

14. Control circuitry configured to be communicably coupled to a heating device and a temperature sensor, the control circuitry configured for:
 control the heating device in a gradual warming control mode by applying a first power to a coil of the heating device in response to the temperature sensor detecting a temperature of a food pan below a minimum preset temperature; and
 switch the heating device from the gradual warming control mode to a normal control mode by applying a second power to the coil of the heating device in response to the temperature sensor detecting the temperature of the food pan above the minimum preset temperature, wherein the second power is higher than the first power such that the second power causes the coil to heat the food pan faster than the first power.

15. The control circuitry of claim 14, wherein, the first power is electrical power causing the coil to provide induction warming of the food pan gradually.

16. The control circuitry of claim 14, wherein the control circuitry is further configured to provide the normal control mode by controlling the heating device in accordance with a temperature selection received via a user interface.

17. The control circuitry of claim 14, the control circuitry is further configured to provide the normal control mode by controlling the heating device in accordance with a power selection received via a user interface.

18. The control circuitry of claim 14, wherein the control circuitry is further configured to:
  receive a presence indication indicating that the food pan is in position relative to the heating device; and
  initiate the gradual warming control mode in response to receiving the presence indication.

19. The control circuitry of claim 14, wherein the control circuitry comprises a processor and a memory.

20. The control circuitry of claim 14, wherein the coil is an induction coil.

* * * * *